April 5, 1927.

C. J. RANDALL ET AL 1,623,208

MACHINE FOR STRIPPING VULCANIZED ARTICLES

Filed Feb. 1, 1924   5 Sheets-Sheet 3

Inventors
CHESTER J. RANDALL &
CHARLES WURTENBERG
By their Attorney
Ernest Hopkinson April 5, 1927.  C. J. RANDALL ET AL  1,623,208
MACHINE FOR STRIPPING VULCANIZED ARTICLES
Filed Feb. 1, 1924     5 Sheets-Sheet 5

Inventors
CHESTER J. RANDALL &
CHARLES WURTENBERG
By their Attorney

Patented Apr. 5, 1927.

1,623,208

UNITED STATES PATENT OFFICE.

CHESTER J. RANDALL, OF WOONSOCKET, RHODE ISLAND, AND CHARLES WURTENBERG, OF UNION CITY, CONNECTICUT, ASSIGNORS TO THE GOODYEAR'S METALLIC RUBBER SHOE COMPANY, OF NAUGATUCK, CONNECTICUT, A CORPORATION OF CONNECTICUT.

MACHINE FOR STRIPPING VULCANIZED ARTICLES.

Application filed February 1, 1924. Serial No. 689,858.

This invention relates to a machine for stripping vulcanized articles from forms, more particularly to a machine for stripping vulcanized footwear articles having an elongated leg portion from one-piece lasts or trees.

In removing vulcanized footwear articles such as ordinary overshoes from the lasts no difficulty is experienced, as there is no extended leg portion. The trees or lasts now commonly in use in the making and vulcanizing of boots are either made in sections or collapsible, and it is possible to readily remove such articles from the lasts or trees by the use of a machine. In the making of footwear articles, such as bootees, having a relatively high leg portion which is, however, shorter than that of a boot, one-piece lasts or trees are ordinarily used.
Previous to our invention it has been necessary to remove such articles from the trees manually, and considerable time and labor are required for accomplishing this, more particularly in the case of articles vulcanized by the so-called differential cure. In curing by this method a hollow last or tree is used, the interior of which has communication with the interior of the footwear article, and during a portion of the vulcanization period a differential pressure is applied, usually by creating a vacuum within the last. Due to this the inner wall of the article is driven into intimate contact with the surface of the last and is therefore difficult to separate from the last when the cured article is withdrawn. As a consequence the manual removal of vulcanized bootees or similar articles from the forms on which they have been cured is not only a laborious and time consuming operation, but quite a number of the articles are either damaged or in some cases entirely ruined.

An object of our invention is to provide an automatic means for stripping angular articles of vulcanized material, such as footwear, from forms.

Another object is to provide a means for rapidly stripping vulcanized footwear or other articles from forms without injury to the articles.

Still another object is to provide means for stripping vulcanized footwear articles, cured by the differential process, from one-piece forms.

The invention consists broadly in means for gripping a form, means for gripping a vulcanized articles disposed on the form, and means for successively imparting different relative movements to said first two means to strip the article from the form. In the case of articles cured by the differential process means are also provided for breaking the adhesion between the article and form prior to the beginning of the stripping movements.

For a detailed disclosure of the invention reference is had to the accompanying specification and drawings, in which latter.

Figure 4:
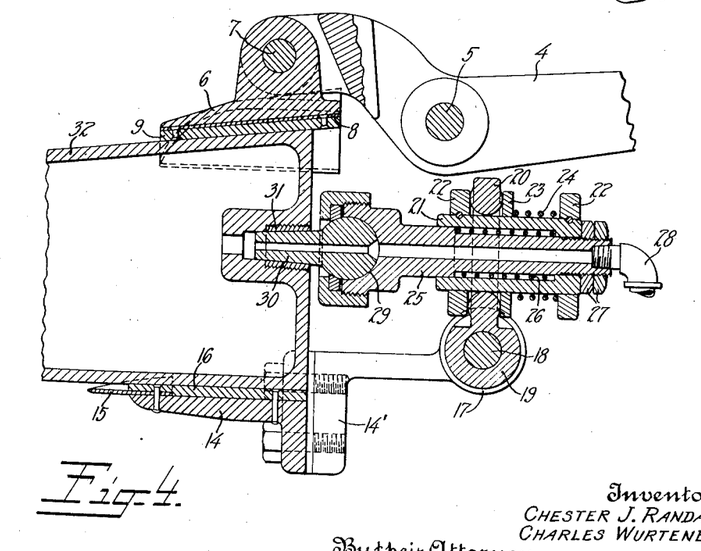
Figure 4 is an enlarged sectional detail of the form gripping and adhesion breaking mechanisms.

Referring to the drawings the numeral 1 designates a carriage forming the base of the machine, and provided with handles 2 secured in the side frames 3, by means of which the machine may be moved from place to place as convenience dictates. Mounted at the top of the side frames 3 is a lever 4 pivoted at 5 to the frames, and carrying at its forward end a gripping or clamping member 6 pivotally connected to it at 7. The face of the clamping member is downwardly concave and provided with a detachable sheet 8 of metal or other suitable material to which are riveted or otherwise secured strips 9 of leather or other suitable material for frictionally gripping the last (Fig. 4). A tree gripping cylinder 10 is pivotally connected to the side frames 3 at 11, and its piston 12 is pivotally connected to the rear end of lever 4 at 13, while movement of the lever is yieldingly resisted by the springs 13' secured at one end to the lever and at the opposite end to the respective frames 3. A fixed lower gripping or clamping member 14 is secured to lugs 14' on the frames 3, and at its forward end is provided with a pointed guide 15 adapted to be inserted between the last and the tongue of the bootee or other article. This guide is concaved to a shape approximating that of the curve of the last leg portion. The upper concave surface of the clamping member 14 is provided with a series of strips 16 of leather or other material similar to the strips 9 of the upper clamping member.

The inner sides of the frames 3 are provided with lugs 17 in which is journaled a shaft 18, having secured thereto a sleeve 19 with a supporting ring 20 projecting upwardly therefrom. Freely movable in the ring 20 is a sleeve 21, to the ends of which are pinned collars 22, and the ring 20 is yieldingly held between one of these collars and the washer 23 by a coiled spring 24 surrounding the sleeve 21. Slidably mounted in the sleeve 21 is a tubular plunger 25, and disposed between the plunger and sleeve is a coiled spring 26 bearing against shoulders on the respective parts and tending to move the plunger to the left as shown in Fig. 4, which movement is limited by the nuts 27 threaded on the end of the plunger. Communicating with the rear end of the plunger is a supply nipple 28 for compressed air or other fluid, while secured to the other end of the plunger by a ball and socket joint 29 is a tapered nipple 30 adapted to fit into a corresponding socket 31 in the head of the last or tree 32.

Figure 1:
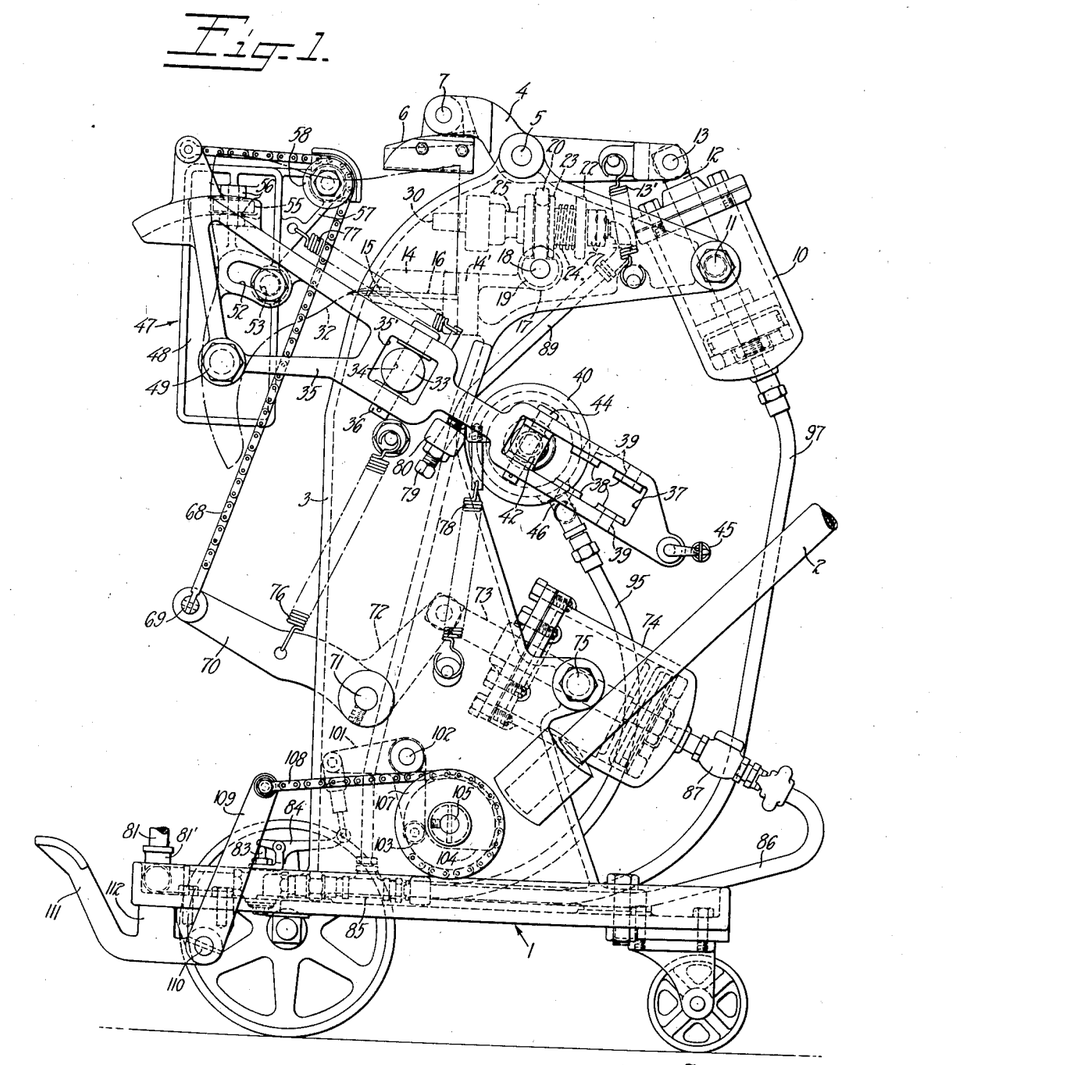
Figure 1 is a side elevation of an embodiment of our invention as applied to the stripping of footwear articles.
Figure 3:
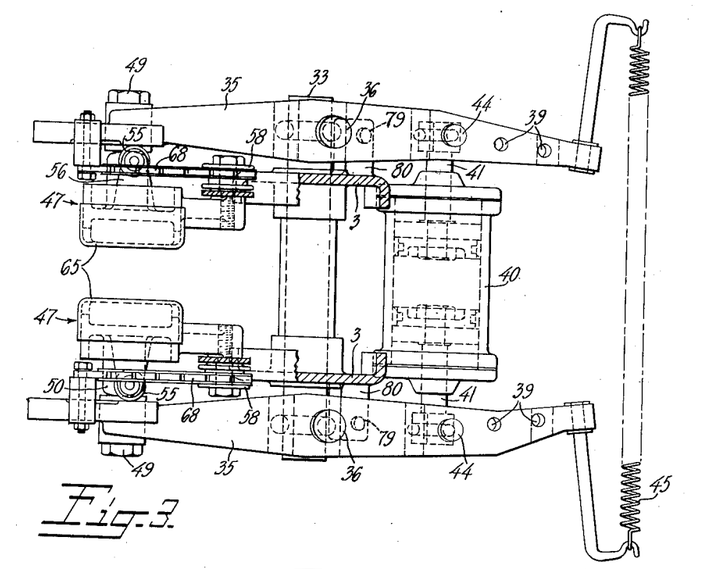
Figure 3 is a top plan view with parts broken away;
Figure 10:
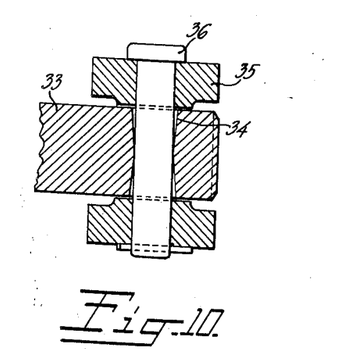
Figure 10 is a detailed section of a pivotal connection.
Figure 11:
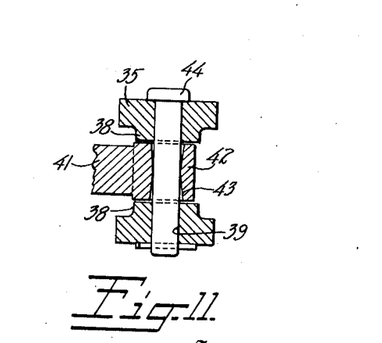
Figure 11 is a similar section of another pivotal connection.

Journaled in the side frames 3 is a shaft 33, the ends of which project outside of the frames as shown in Fig. 3. Each end of the shaft is provided (see Fig. 10) with a transverse bore 34, the outer ends of which bore are slightly elongated longitudinally of the shaft. Clamping arms 35 are pivotally connected to each end of the shaft, and as these arms are identical but one of them will be described. Each arm is provided with an opening 35' adapted to loosely fit over the end of shaft 33, and the arm is pivotally secured to the shaft by a pin 36 passing through the arm and through the bore 34 in the shaft. It will be seen that by this construction the arms 35 can pivot on the pins 36 in directions to move their ends toward and from each other for clamping purposes, and by a rocking movement of the shaft 33 they can tilt forwardly and backwardly on the frames 3, and in addition to these movements they have a slight rocking movement on their longitudinal axes with respect to the shaft 33, due to the enlarged ends of the bores 34. Adjacent its rear end each lever 35 is provided with an elongated opening 37, in the opposed walls of which are aligned pairs of lugs 38, through which extend aligned bores 39. Disposed between the arms 35 is a double action clamping cylinder 40, the piston rods 41 of which have enlarged ends 42 adapted to be loosely disposed between any of the pairs of aligned lugs 38 (Figs. 1, 3 and 11). The enlarged ends 42 are provided with bores 43 extending therethrough, the outer ends of which are elongated in a direction longitudinally of the piston rods in a manner similar to the bores 34. Adapted to extend through aligned bores 39 in each arm 35 and through the bores 43 in the piston rods are pivot pins 44, by means of which the clamping cylinder 40 is connected to the arms 35. It will be seen that the piston rods of the cylinder may be connected to the arms 35 at various locations to vary the spread or opening of the rear ends of the arms 35. The action of the cylinder 40 in opening the arms is yieldingly resisted by a spring 45 secured to the rear ends of the arms. Attached to the middle portion of the cylinder 40 is an inlet nipple 46 for compressed air or other fluid.

Figure 2:
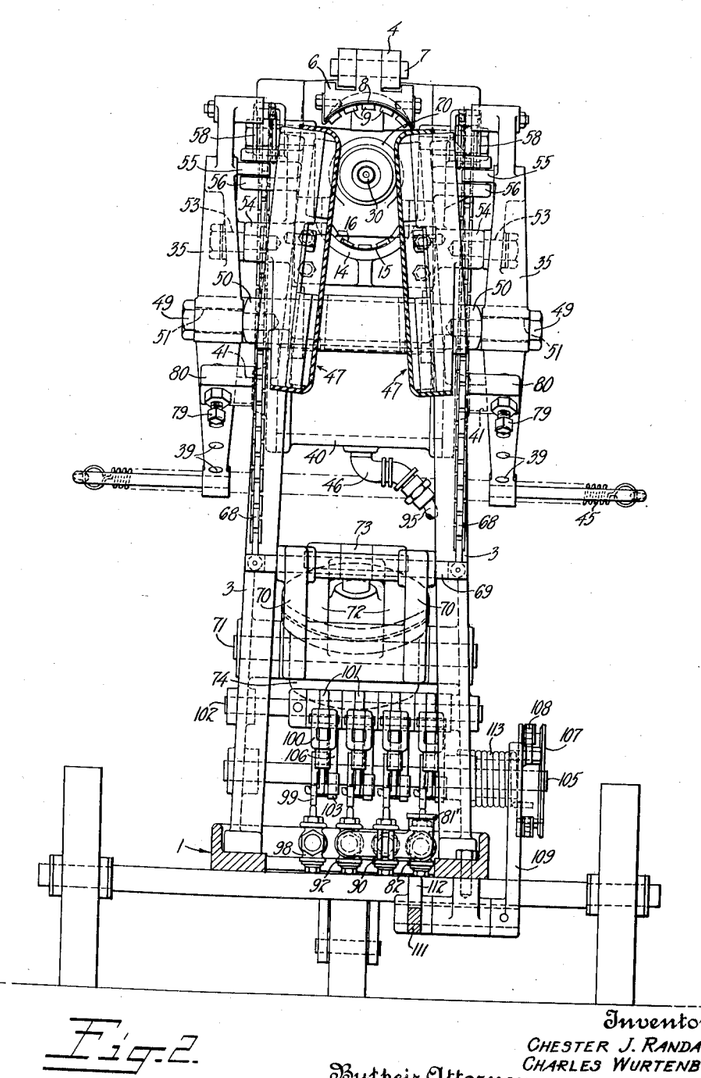
Figure 2 is a front elevation, partly in section and with parts omitted.
Figure 8:
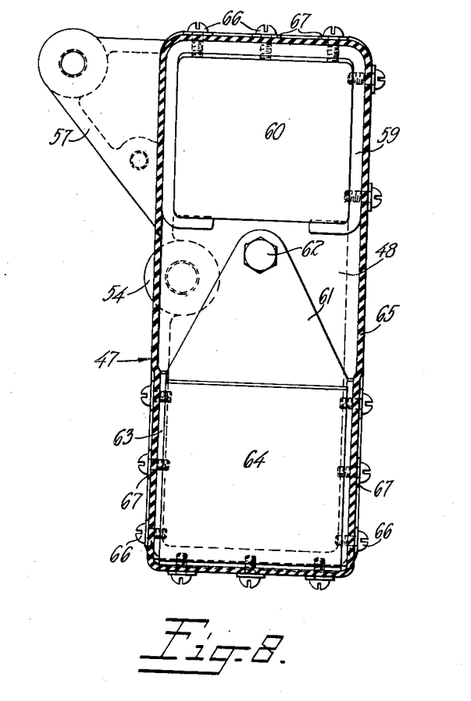
Figure 8 is a front elevation, partly in section, of an article clamp;
Figure 9:
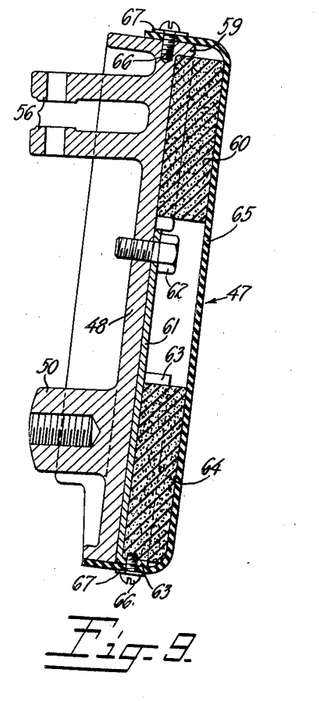
Figure 9 is a central longitudinal section through Figure 8.

Pivotally carried by the forward portion of each clamping arm 35 is an article clamp 47, and as these clamps are identical in construction but one of them will be described. Each clamp comprises a frame 48 which is pivotally connected at its lower end to its arm 35 by a pivot pin 49 freely movable in the arm 35 and threadedly connected to a lug 50 projecting from the back of the frame 48 (Figs. 2 and 9). The portion of the pivot pin 49 within the arm 35 is oppositely tapered as shown at 51 in Fig. 2, and by reason of this taper and the rounded end of the lug 50 the frame 48 can rock universally to a slight extent on the arm 35 as well as pivot or rotate on the axis of the pivot pin. In order to limit the pivotal movement of the frame a curved slot 52 is provided in the clamping arm through which extends a stop pin 53 threadedly secured in a lug 54 on the clamp frame. To provide a frictionless bearing for the upper part of the clamp frame on the clamping arm it is provided with a roller 55 mounted in lugs 56 extending from the back of the frame, which roller bears against the inner face of the clamping arm and moves on said face when the clamp is rocked on its pivot. Projecting from the upper side edge of the clamp frame is a bracket 57 in which is mounted a bearing roller 58 for a purpose to be later described. The inner face of the frame 48 is provided at its upper portion with a flange 59 within which is disposed a pad 60 of sponge rubber or other suitable material (Figs. 8 and 9). Below this pad a plate 61 is pivotally secured to the frame 48 by a pivot pin 62, and the
lower portion of the plate is provided with
a flange 63 within which is disposed a second sponge rubber pad 64. Over the pads
60 and 64 is stretched a sheet 65 of rubber
or other suitable material, the upper edge
portions of which are secured to the frame
48 by screws 66 and washers 67, while the
lower portion of the sheet is secured by similar screws and washers to the flange 63.

Chains 68 are secured at one end to the
upper end of each clamping arm 35, then extend over a corresponding bearing roller
58 and are secured at their lower ends to a
rod 69 extending between the spaced arms
70 of a double bell crank lever attached to a
rock shaft 71 journaled in the side frames 3.
The other spaced arms 72 of the bell crank
lever are pivotally secured to the end of a
piston rod 73 disposed between them, which
piston rod is actuated by a stripping cylinder 74 pivotally mounted in the side frames
3 at 75. The bell crank lever is yieldingly
held in its inoperative position by coil
springs 76 secured to the arms 70 of the
lever and to the respective side frames 3.
Movement of each clamp 47 on its pivot is
yieldingly resisted by a coil spring 77 secured at one end to the bracket 57 and at the
other end to the corresponding clamping
arm 35. Tilting movement of the clamping
arms 35 is yieldingly resisted by coil springs
78, each of which is secured to an arm 35 and
to the corresponding side frame 3. In order
to secure proper sequence in the movement
of the parts the springs 77 are made weaker
than the springs 78 as will be later explained.
Downward movement of the rear ends of the
clamping arms 35 is limited by stop pins 79
threaded through lugs 80 in the side frames
and bearing against the lower sides of the respective arms.

Figure 5:
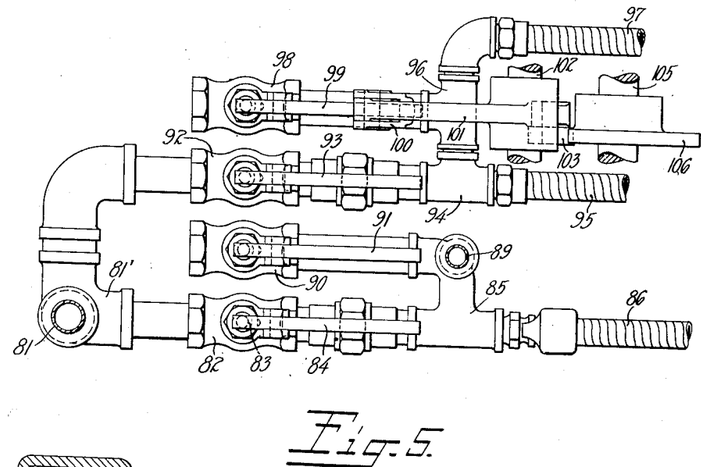
Figure 5 is a detail plan of the pneumatic control mechanism;
Figures 6, 7:
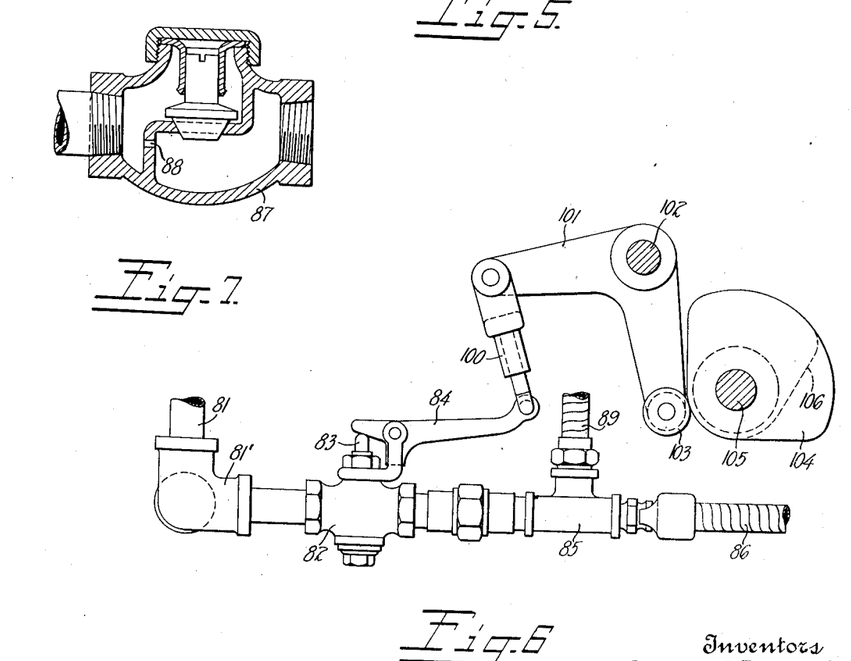
Figure 6 is a side elevation thereof.
Figure 7 is an enlarged section of a check valve.

A control mechanism for actuating the
previously described parts is provided as
follows: A supply pipe 81 for air under
pressure or other fluid is connected to a
fitting 81' on the carriage 1, to one arm of
which fitting an inlet valve 82 is connected
(Figs. 5 and 6), the stem 83 of which valve is
actuated by the pivoted lever 84. A multiple armed fitting 85 is connected to the outlet side of valve 82, and from one branch
of this fitting a flexible pipe 86 leads to a
check valve 87 connected to the inlet of the
stripping cylinder 74. This check valve is
of ordinary construction, but is provided
with a by-pass 88 on its inlet side as shown
in Fig. 7, for a purpose to be later explained.
Also leading from the fitting 85 is a flexible
pipe 89 connected to the nipple 28 of the adhesion breaking mechanism. Also connected
to the fitting 85 is an exhaust valve 90 opening to the atmosphere and actuated by a
pivoted lever 91 similar in all respects to the
lever 84. Communicating with a branch of
the fitting 81' is a second inlet valve 92 in
all respects similar to the valve 82 and controlled by the pivoted lever 93. Connected
to the outlet side of the valve 92 is a
T fitting 94 from one of whose outlets
leads a flexible pipe 95 connected to the
supply nipple 46 of the article clamping cylinder 40. Also connected to the T
94 is a second T 96, from one branch
of which leads a flexible pipe 97 connected
to the tree clamping cylinder 10. Connected to the other outlet of the T 96 is an exhaust valve 98 governed by the pivoted lever
99. The lever 84 of valve 82 is connected by
an adjustable link 100 to one arm of a bell
crank lever 101 mounted on a shaft 102 extending between the side frames 3, the
other end of the bell crank lever carrying a cam roller 103, cooperating with
which roller is a cam 104 secured on a
cam shaft 105 mounted in the frames 3.
The actuating mechanisms for the valves
90, 92 and 98 are identical in all respects
with that just described, with the exception
that the cams 106 for the exhaust valves 90
and 98 are differently shaped. Secured on
the cam shaft 105 is a chain pulley 107, to
which is secured one end of a chain 108
which at its other end is connected to a lever
109 pinned to a rock shaft 110 mounted below the carriage 1, and this rock shaft is
actuated by a foot lever 111 provided with
the stop 112 (Figs. 1 and 2). In order to
return the parts after actuation a coil spring
113 is disposed around the cam shaft 105
adjacent the chain pulley 107, one end of said
spring being secured to the pulley and the
other end to the side frame 3.

In operation the article clamping cylinder 40 is disposed between the clamping
arms 35 in proper position to give the desired opening of the rear ends of said arms
when actuated. The footwear article and
last are then placed between the clamps 47,
the guide 15 is inserted between the front leg
portion or the tongue of the article and the
front of the leg portion of the last, while
the back of the leg portion of the article is
drawn up over the clamp 6 and rolled back,
and the socket 31 of the last is disposed over
the nipple 30 of the adhesion breaking
mechanism. Due to the ball and socket
mounting of the nipple 30 and the longitudinal and universally angular adjustment of
the plunger 25 the connection with the last
may be readily effected. The foot lever 111
is then pressed down, and the shape and arrangement of the valve actuating cams 104
and 106 are such that the exhaust valves 90
and 98 are first closed and the inlet valve
92 then opened. Air then flows through
the pipe 97 to the tree clamping cylinder 10,
thereby closing the gripping or clamping
jaw 6 on the tree, and air also flows through
the flexible pipe 95 to the article clamping cylinder 40, thereby spreading the rear ends of the clamping arms 35 and closing the clamps 47 on the foot portion of the article. As before stated the connections of the arms 35 with the shaft 33 and piston rods 41 allow the arms 35 to turn slightly on their longitudinal axes, and the connections of the clamps 47 with arms 35 permit a limited universal movement of the clamps on the arms, thereby permitting the pressure of the clamps on the article being stripped to be properly equalized. In the continued downward movement of the foot lever 111 the inlet valve 82 is next opened, and air then flows through the pipe 89 to the adhesion breaking mechanism. This air passing through the nipple 30 enters the interior of the last or tree 32 and passes out through the small openings in the foot portion of the last between the last and the interior of the footwear article, thereby efficiently breaking the adhesion between the article and last or tree. Air also flows from the valve 82 through the pipe 86 and the by-pass 88 of check valve 87 in limited quantity into the stripping cylinder 74, which then slowly actuates the double bell crank lever to pull downwardly on the chains 68. As the springs 77 are weaker than the springs 78 and due to the resistance the article offers until the heel has been partly stripped the arms 35 are first unaffected by this movement, but by reason of the lateral pressure on the pulleys 58 by the chains the clamps 47 are swung outwardly on the pivot pins 49 until the stop pins 53 reach the ends of the slots 52. The pivot pins 49 are disposed approximately at the center of the curve formed by the lower heel line of the last when the latter is properly disposed in the clamps, and as a result of the pivotal movement of the clamps 47 the footwear article is bent at a point substantially in alignment with the pivot pins 49 and its heel and leg portions moved outwardly until the lowest point of the heel line curve of the article has reached the highest point of the heel line curve of the last or tree, which occurs about at the time the stop pins 53 reach the ends of slots 52. In this first or rotational movement of clamps 47 the heel of the article is therefore stripped from the last. The clamp pads 60, which engage the sides of the heel, are fixedly held in the clamps 47 and swing outwardly with them. The pads 64 engage the sides of the toe portion of the article, which portion remains stationary on the last during the heel stripping operation, and by the pivotal connection 62 of the lower pads to the clamps the pads and clamps can have a relative movement during the heel stripping operation, thereby obviating excessive friction on the sides of the article toe. As further movement of the clamps 47 on pivots 49 is prevented after the heel is stripped, the continued downward pull of the chains 68 then actuates the entire article clamping mechanism in opposition to the springs 78 so that the shaft 33 turns in the frames 3 and the forward or upper ends of the clamping arms 35 move downwardly. It will be seen that in this last movement the entire article clamping mechanism partakes of a movement of translation on a circular arc whose center is the axis of shaft 33, and in this movement the article is stripped bodily from the tree. Due to the gradual admission of air to the stripping cylinder 74 the stripping of the article takes place relatively slowly and not by a quick jerk which would be liable to strain and injure the article. The foot lever 11 is then released and the spring 113 causes the cam shaft 105 to move the cams 104 and 106 in the reverse direction, thereby closing the inlet valves 82 and 92 and opening the exhaust valves 90 and 98. As a result air is cut off from the adhesion breaking mechanism, the springs 13' open the tree gripping jaw 6 to release the tree, and the spring 45 acts on the clamping arms 35 to open the clamps 47 and free the article. Air also escapes from the stripping cylinder 74 through the check valve 87, and as a result the clamping mechanism tilts upwardly under the influence of springs 76, 77 and 78 until the arms 35 strike the stops 79, after which the springs 77 cause the clamps 47 to move on their pivots until the stop pins 53 reach the right hand ends of the slots 52 as shown in Fig. 1.

It will be seen that by our invention a machine has been provided for rapidly and automatically stripping vulcanized articles from forms, and without liability of injury to the article.

While a specific embodiment of the invention particularly adapted for stripping footwear articles from trees, especially those cured under a differential cure, has been shown and described, it is obvious that the invention is not so limited in its application and it may be used for stripping footwear articles not cured under the differential cure process, and also by varying the shape of the article and form clamps it may be adapted for stripping other articles than footwear from their forms, especially angular shaped articles requiring a movement of part of the article with respect to the form before the entire article can be stripped therefrom.

It is obvious that with the detailed disclosure of the invention numerous modifications will suggest themselves to those skilled in the art and it is not desired to limit the invention otherwise than as set forth in the appended claims.

Having thus described our invention, what we claim and desire to protect by Letters Patent is:

1. In a machine for stripping angular articles of vulcanized material from forms, means for gripping the form, means for gripping the article, and means for separating the form and article by successive relative movements of rotation and revolution.

2. In a machine for stripping angular articles of vulcanized material from forms, means for gripping the form, means for gripping the article, and means for successively imparting to said last means movements of rotation and revolution.

3. In a machine for stripping angular articles of vulcanized material from forms, means for gripping the form, pivoted means for gripping the article, pivoted supporting means for said article gripping means, and means for successively moving said last two means on their pivots to strip the article.

4. In a machine for stripping footwear articles from forms, means for gripping the form, means for gripping the article, means for giving said last means a movement of rotation about a center approximating that of the curve of the heel after gripping the article, and means for also giving it a movement of translation on a larger radius.

5. In a machine for stripping angular articles of vulcanized material from forms, means for gripping the form, pivotally mounted means for gripping the article, means for moving said last means on its pivot after gripping an article, means for limiting the pivotal movement therof, and means whereby said moving means may impart a movement of translation to the article gripping means.

6. In a machine for stripping angular articles of vulcanized material from forms, means for gripping the form and the article, means for breaking the adhesion between the form and article, means for stripping the article by successive relative movements of the form and article, and control means for successively putting all said means into operation.

7. In a machine for stripping angular articles of vulcanized material from forms, pneumatically operated means for gripping the form and article, pneumatic means for breaking the adhesion between the form and article, pneumatically operated means for stripping the article by successive relative movements of the form and article, and manual control means for successively putting all said means into operation.

8. In a machine for stripping angular articles of vulcanized material from forms, means for breaking the adhesion between the article and form, and means for removing the article by successive relative bending and bodily movements of the article and form.

9. In a machine for stripping footwear articles from trees, means for gripping the tree, means for imparting successive relative turning movements to the article and tree to separate them, and graduated spring means for insuring proper sequence in said turning movements.

10. In a machine for stripping footwear articles from trees, means for gripping the tree, means for gripping the article including pivoted clamps, and means for successively closing said clamps to grip the article, rotating them on their pivots to partially strip the article and then bodily moving them with respect to the tree gripping means.

11. In a machine for stripping footwear articles from trees, means for gripping the tree, means for gripping the foot portion of the article including clamps pivotally mounted adjacent the toe portion of the article, and means for successively closing said clamps, rotating them on their pivots to dislodge the heel portion of the article and then bodily moving them to withdraw the article from the tree.

12. In a machine for stripping footwear articles from trees, means for gripping the tree, relatively movable means for gripping each side of the article at spaced points, means for breaking the adhesion between the tree and article, and means for imparting to the article gripping means successive different movements to strip the article from the tree.

13. In a machine for stripping footwear articles from trees, means for gripping the tree, clamping arms pivoted for movement toward and from each other and also for tilting movement, clamps pivotally mounted on said arms, means for closing said gripping means on the tree, means for moving said arms to close said clamps on the article, and means for successively moving said clamps on their pivots to partially free the article and tilting said arms to entirely withdraw the article from the tree.

14. In a machine for stripping footwear articles from trees, a frame, means for gripping the tree, arms pivoted at the sides of the frame for clamping and stripping movements, article clamps pivoted on said arms, antifriction guides carried by said clamps and bearing on said arms, bearing rollers mounted on said clamps flexible means secured to said clamps and extending over said rollers, means for exerting tension on said flexible means, and means whereby said tension exerting means may first move said clamps on their pivots and then impart a stripping movement to said arms.

15. In a machine for stripping footwear articles from trees, means for gripping the tree, means for actuating the same, pivoted article clamps having fixed and pivoted clamping pads, and means for actuating said clamps, to grip and strip the article from the tree.

16. In a machine for stripping footwear articles from trees, means for gripping the tree, means for actuating the latter, pivotally mounted article clamps, fixed and movable clamping pads carried thereby, and means for successively imparting clamping, pivotal and translatory movements to said clamps, to strip the article from the tree.

17. In a machine for stripping footwear articles from trees, means for gripping the tree, means for actuating the latter, pivotally mounted rocking clamp arms, article clamps pivotally mounted on said arms and having a limited universal movement thereon, and means for successively actuating said arms and clamps to grip the article and strip it from the tree.

18. In a machine for stripping footwear articles from trees, means for gripping the tree, means for gripping the article, means for stripping the article by successive relative movements of the tree and article, means for actuating said previously named means, and means whereby the stripping means may be actuated more slowly than the others.

Signed at Woonsocket, county of Providence, and State of Rhode Island, this 16th day of January, 1924.

CHESTER J. RANDALL.

Signed at New Haven, county of New Haven, and State of Connecticut, this 28th day of January, 1924.

CHARLES WURTENBERG.